(12) United States Patent
Kenyon et al.

(10) Patent No.: US 7,143,406 B2
(45) Date of Patent: Nov. 28, 2006

(54) ASYNCHRONOUS SOFTWARE UPDATE

(75) Inventors: Jeremy A. Kenyon, Kirkland, WA (US); Geoffrey K. Bauman, Seattle, WA (US)

(73) Assignee: WildTangent, Inc., Redmond, WA (US)

( * ) Notice: Subject to any disclaimer, the term of this patent is extended or adjusted under 35 U.S.C. 154(b) by 1025 days.

(21) Appl. No.: 09/768,658

(22) Filed: Jan. 23, 2001

(65) Prior Publication Data
US 2002/0100035 A1 Jul. 25, 2002

(51) Int. Cl.
*G06F 9/44* (2006.01)
*G06F 9/445* (2006.01)
*G06F 15/173* (2006.01)

(52) U.S. Cl. ........................ 717/173; 717/178; 709/223
(58) Field of Classification Search ........ 717/168–178; 709/200–203, 217–219, 223, 227, 220; 714/38; 707/10; 358/1.15; 455/419
See application file for complete search history.

(56) References Cited

U.S. PATENT DOCUMENTS

| | | | |
|---|---|---|---|
| 5,473,772 A | 12/1995 | Halliwell et al. | |
| 5,495,610 A | 2/1996 | Shing et al. | |
| 5,742,829 A * | 4/1998 | Davis et al. | 717/178 |
| 5,845,077 A * | 12/1998 | Fawcett | 709/221 |
| 5,896,566 A * | 4/1999 | Averbuch et al. | 455/419 |
| 5,919,247 A | 7/1999 | Van Hoff et al. | |
| 6,006,034 A | 12/1999 | Heath et al. | 717/170 |
| 6,009,274 A | 12/1999 | Fletcher et al. | 717/173 |
| 6,035,423 A | 3/2000 | Hodges et al. | 714/38 |
| 6,070,012 A * | 5/2000 | Eitner et al. | 717/168 |
| 6,080,207 A | 6/2000 | Kroening et al. | 717/172 |
| 6,094,679 A | 7/2000 | Teng et al. | 709/220 |
| 6,167,567 A * | 12/2000 | Chiles et al. | 717/173 |
| 6,256,773 B1 | 7/2001 | Bowman-Amuah | 717/121 |
| 6,282,709 B1 * | 8/2001 | Reha et al. | 717/175 |
| 6,353,926 B1 * | 3/2002 | Parthesarathy et al. | 717/170 |
| 6,452,692 B1 * | 9/2002 | Yacoub | 358/1.15 |
| 6,711,572 B1 * | 3/2004 | Zakharov et al. | 707/10 |
| 6,804,707 B1 * | 10/2004 | Ronning | 709/220 |
| 2002/0087623 A1 * | 7/2002 | Eatough | 709/203 |
| 2002/0100036 A1 * | 7/2002 | Moshir et al. | 717/173 |

FOREIGN PATENT DOCUMENTS

WO WO 00/68836 A 11/2000

* cited by examiner

*Primary Examiner*—Antony Nguyen-Ba
(74) *Attorney, Agent, or Firm*—Schwabe, Williamson & Wyatt, P.C.

(57) ABSTRACT

A server is equipped with a distributor/updater to accept periodic check in by client computers to determine if the client computers' software needs to be updated. The distributor/updater is designed to provide each client computer, determined to require update, with a task list listing a number of tasks to be asynchronously performed at a later point or later points in time by the client computer to update the client computer's software. The tasks may include asynchronous subsequent requests of the server or third party servers for software parts. The tasks also include installation tasks to be performed upon obtaining the required software parts. The client computer is also equipped with a complementary distributor/updater to perform the periodic check-in and to schedule the update tasks accordingly. In one embodiment, the server's distributor/updater is also designed to be able to regulate its own workload, optionally asking parts requesting clients to retry later.

24 Claims, 8 Drawing Sheets

Update Task List ~ 300

[Retrieve]
Retrieval Instructions [Source, Directory, Part Ids] ~ 302

[Install]
Compile/Link Instructions [Compiler/Linker, Part Ids] ~ 304
Install/Update Pgm Exec Instructions [Pgm Ids] ~ 306
Registry/DB Update Instructions ~ 308

| SW ID ~ 502 | Old Version ~ 504 | Computing Environment Factors ~ 506 | Update Task List ID ~ 508 | Other Data ~ 509 |
|---|---|---|---|---|
| | | | | |
| | | | | |
| | | | | |
| | | | | |

| Client ID ~ 522 | Client Basic Info ~ 524 | Client Computing Environment Info ~ 526 | | Other Data ~ 529 |
|---|---|---|---|---|
| | | | | |
| | | | | |
| | | | | |
| | | | | |

Figure 5b

ASYNCHRONOUS SOFTWARE UPDATE

BACKGROUND OF THE INVENTION

1. Field of the Invention

The present invention relates to the field of data processing. More specifically, the present invention relates to the distribution and updating of software.

2. Background Information

With advances in microprocessor, networking and telecommunication technologies, increasingly computing devices are networked together through private and public networks, such as the Internet. As a result, for improved operational efficiency, increasingly software vendors prefer to distribute software products, including updates, online.

Typically, a client computer would periodically check in with a central server of a software vendor, when the client computer is connected online, and exchange information with the server, to allow the server to determine if the client computer's installed software supplied by the software vendor needs to be updated. If it is determined that update is necessary, the user of the client computer will be so informed, and asked whether the user would like to have the software updated. If the user agrees to the update, the updates would be downloaded immediately, and the software in turn would be updated immediately thereafter. During the download and re-installation, the client computer would be occupied and unavailable for normal usage by the user. If the user does not want to have the software updated at the time, the updates would not be downloaded, and as a result, the software would not be updated. The user will be prompted again next time when client computer is connected online again.

These prior art techniques suffer from a number of disadvantages. As described earlier, the download is performed immediately when the user agrees to the update, and the user's computer is tied up during the download and re-installation, just when the user wants to do some productive work, which is often the reason why the user goes online. As a result, many users would decline to accept the update offer. Thus, under the prior art techniques, there are often more down level versions of the software being deployed than otherwise necessary. Moreover, overtimes, the repeated prompting of the user to update the software can becoming annoying to the user. Further, the prior art techniques are not scalable to support a very large number of users, as the server capacity necessary to provide immediate download to hundreds of thousands of consenting users in a responsive manner is prohibitively costly.

Thus, an improved approach to software distribution/update is desired.

SUMMARY OF THE INVENTION

A server is equipped with a distributor/updater to accept periodic check in by client computers to determine if the client computers' software needs to be updated. The distributor/updater is designed to provide each client computer, determined to require update, with a task list listing a number of tasks to be asynchronously performed at a later point or later points in time by the client computer to update the client computer's software. The tasks may include asynchronous subsequent requests of the server or third party servers for software parts. The tasks also include installation tasks to be performed upon obtaining the required software parts. The client computer is also equipped with a complementary distributor/updater to perform the periodic check-in and to schedule the update tasks accordingly. In one embodiment, the server's distributor/updater is also designed to be able to regulate its own workload, optionally asking parts requesting clients to retry later.

BRIEF DESCRIPTION OF DRAWINGS

The present invention will be described by way of exemplary embodiments, but not limitations, illustrated in the accompanying drawings in which like references denote similar elements, and in which:

FIG. 3 illustrates an example update task list, in accordance with one embodiment;

FIGS. 5a–5b illustrate various example data organizations suitable for use to store the various software and client related information for practicing the present invention, in accordance with one embodiment.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a processor based device, using terms such as data, tables, requesting, determining, retrieving, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical and electrical components of the processor based device; and the term processor include microprocessors, micro-controllers, digital signal processors, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation. Further, the description repeatedly uses the phrase "in one embodiment", which ordinarily does not refer to the same embodiment, although it may. Also, the term "software part" will be used, and the term as used herein is intended to include a broad range of software "parts", including but are not limited to patches, modules, routines, components, objects, in source or object form.

OVERVIEW

Figure 1A:
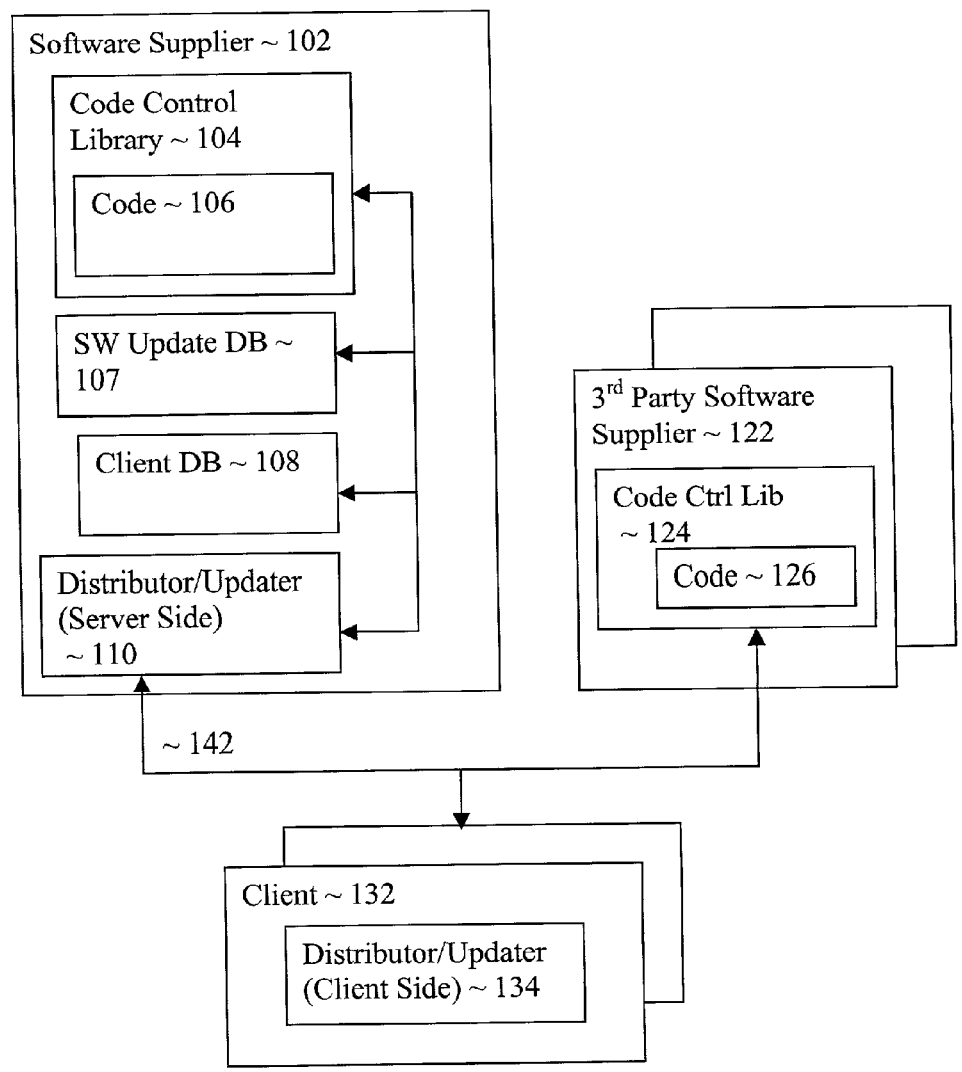
FIGS. 1a–1b illustrate an overview and a method view of the present invention, in accordance with one embodiment.
Figure 1B:
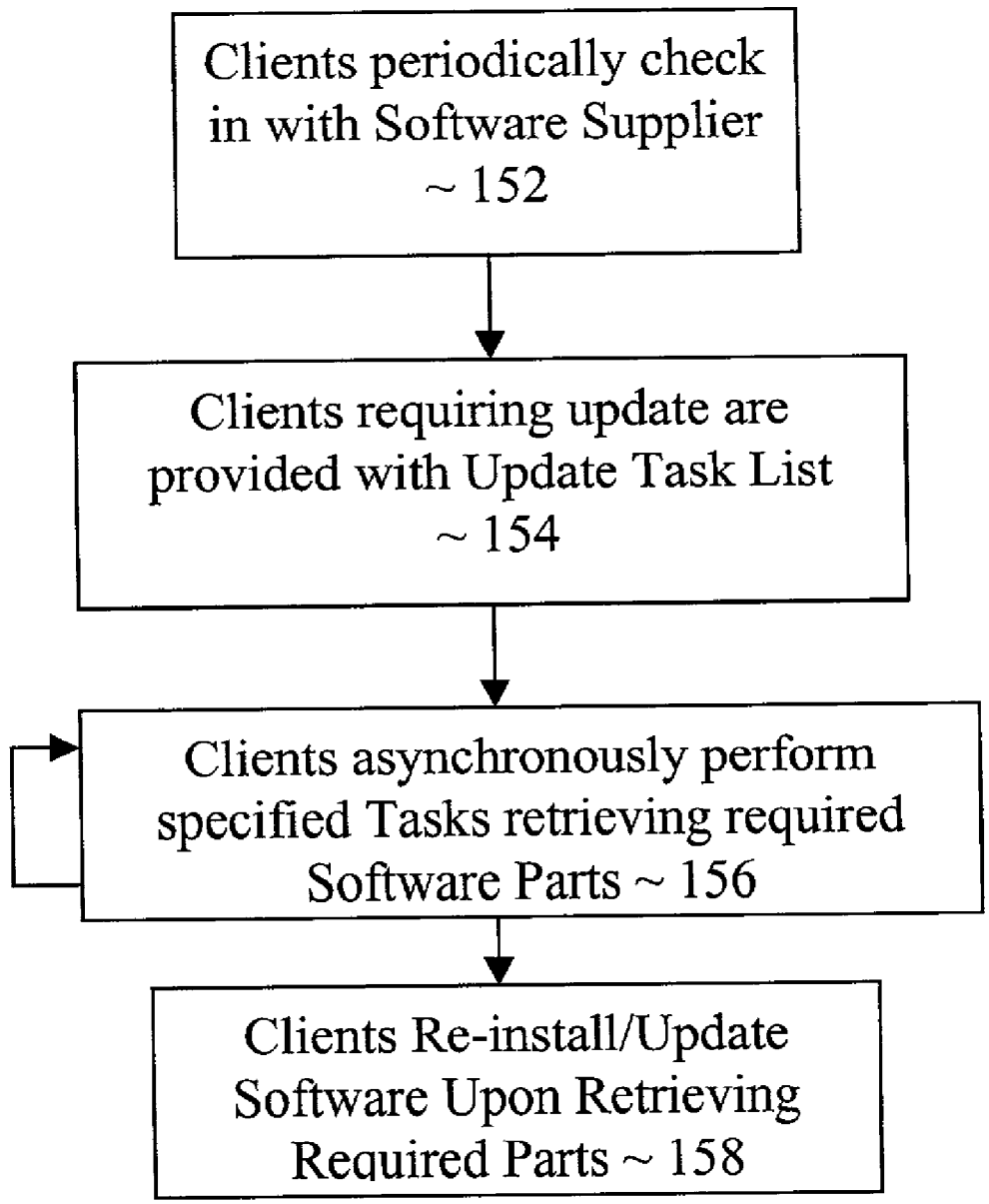

Referring now first to FIGS. 1a–1b, wherein two diagrams illustrating an overview and a method view of the present invention, in accordance with one embodiment, are shown. As illustrated in FIG. 1a, in accordance with the present invention, software supplier 102 (more specifically, its' computing equipment) is provided with distributor/updater (server side) 110 of the present invention, while a number of clients 132 (more specifically, their computing equipment) are each provided with a copy of distributor/updater (client side) 134 of the present invention, to facilitate distribution/update of the software of software supplier 102 installed on clients 132. In addition to the software code 106 itself (stored and managed through e.g. code control library 104), for the practice of the present invention, software supplier 102 (more specifically, its computing equipment) is also provided with software update and client databases 107 and 108 for storing various relevant software update and client related information.

Further, as will be described in more detail below, the software update method of the present invention may also advantageously involve third party software, as illustrated by the presence of third parties 122. Third parties 122 (more specifically, their computing equipment) are provided with their corresponding software 126, controlled and maintained e.g. by code control library 124.

Software supplier 102, third parties 122 and clients 132 are coupled to each other via communication link 142, which is intended to represent a broad range of communication links, including but are not limited to public as well as private, wireline and/or wireless, local/wide area networks. In one embodiment, software supplier 102, third parties 122 and clients 132 are coupled to each other via the Internet.

As illustrated in FIG. 1b, in accordance with the present invention, clients 132, using distributor/updater (client side) 134 would periodically check in with software supplier 102 to facilitate determination whether the software of software supplier 102 installed on the computing equipment of clients 132 needs to be updated, block 152. In response, clients 132 determined to require update, are each provided with an update task list by distributor/updater (server side) 110 of supplier 102, block 154. The update task list enumerates a number of update tasks to be asynchronously performed by clients 132 at a subsequent point or points in time to effectuate the update. Thereafter, at the subsequent point or points in time, typically times that are more convenient to the users of clients 132, clients 132, using distributor/updater (client side) 134, would asynchronously perform the specified update tasks, block 156. The specified update tasks may include re-contacting the server/servers of software supplier 102 or contacting the server/servers of third party suppliers 122 to retrieve required software parts, and the installation tasks, such as compilations, linking or registry updates to be performed, upon retrieving the required software parts. Upon retrieving all the required software parts, clients 132, using distributor/updater (client side) 134, would asynchronously perform the specified installation tasks, causing the installed software of software supplier 102 to be updated and re-installed for usage, block 158.

Accordingly, the present invention advantageously allows the update to be performed at times that are more convenient to the users of the client computers, which in turn would encourage more users to accept the update offers. As a result, it is expected that less users will be operating with down level versions of the software, which in turn would reduce maintenance cost, and increase user satisfaction. The present invention also advantageously allows the update to involve update of dependent software parts supplied by third party suppliers, thereby increasing the range of updates that may be performed, as well as reducing the burden and complication of having a software supplier supplying special modified versions of other third party's software. Further, as will be appreciated from the description to follow, by performing the update tasks asynchronously and allowing the supplier servers to defer servicing of parts requests, the present invention is much more scalable to support very large number of client computers. In one embodiment, upwards of hundreds of thousands client computers will be supported.

The communication between software supplier 102, third parties 122 and clients 132 may be conducted using any one of a number of communication techniques/protocols known in the art. Different protocols may be employed for communication with different parties. In one embodiment, the communication is conducted using the HTTP message protocol, signaled in accordance with the TCP/IP communication protocol.

Code control library 104 and 124 are intended to represent a broad range of code control libraries known in the art, accordingly will not be further described. Distributor/updater (server/client side) 110 and 134, including their operational flows and interactions with each other, as well as software update and client databases 107 and 108 will be described in turn below.

[Note that it is immaterial whether software supplier 102 supplies the software for a fee or for free.]

Distributor/Updater (Client Side)

Figure 2A:
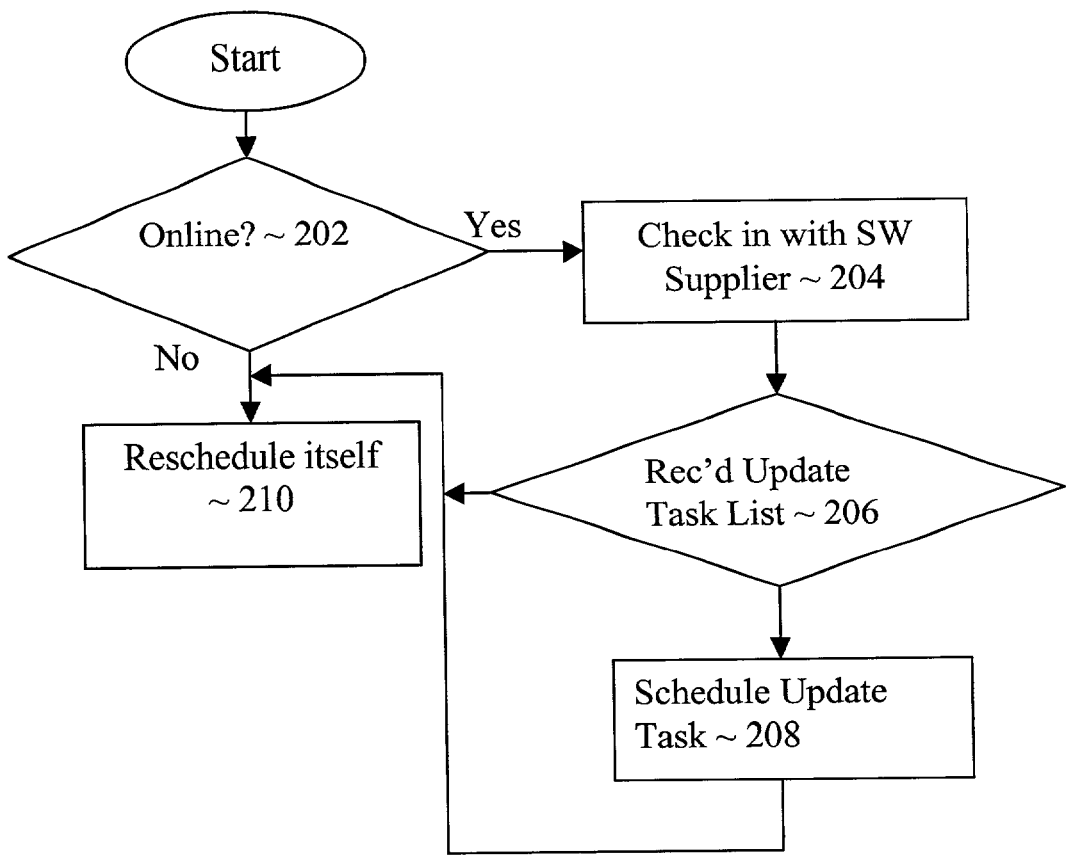
FIGS. 2a–2b illustrate the operational flow of the relevant aspects of the distributor/updater (client side) of FIG. 1, in accordance with one embodiment.
Figure 2B:
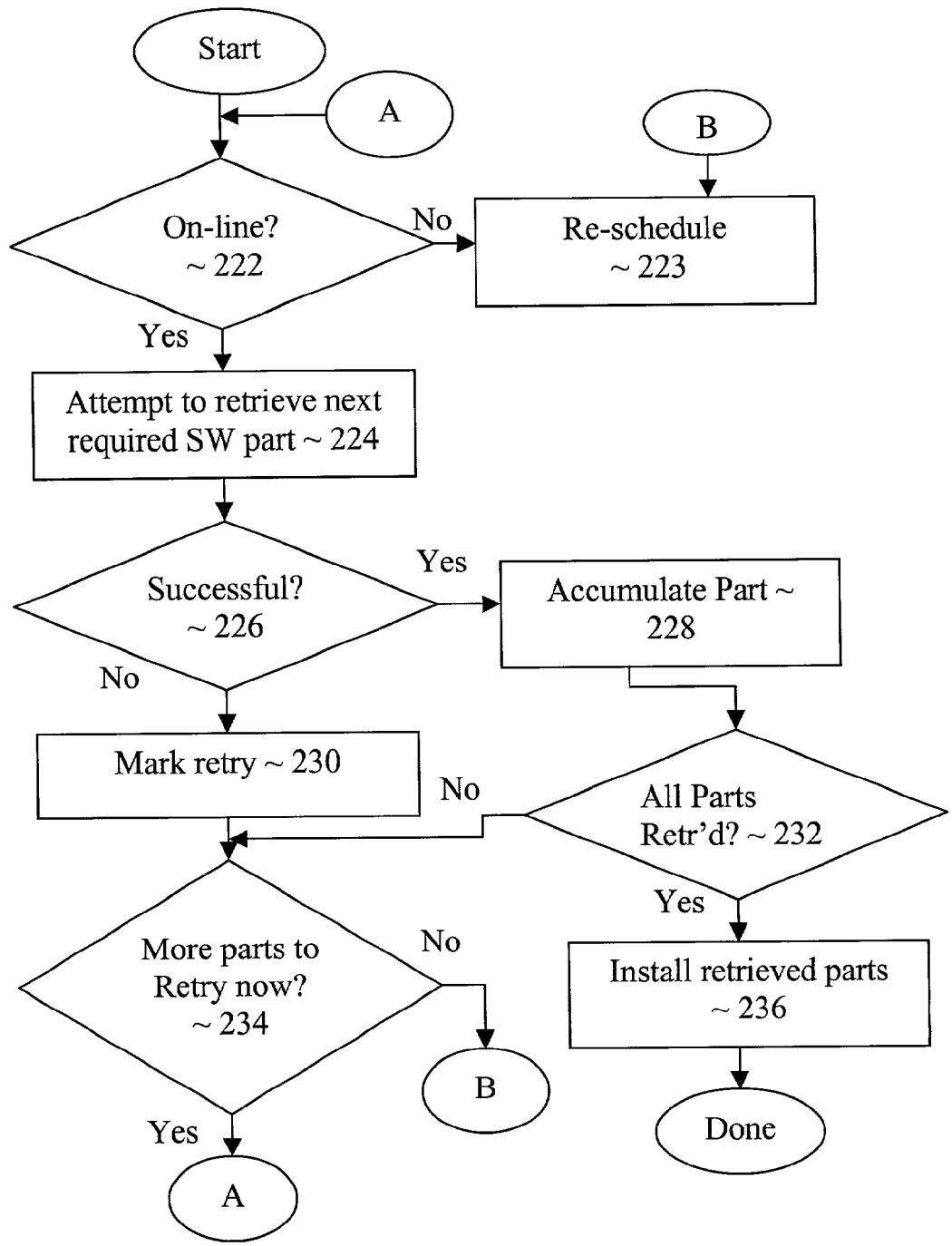

FIGS. 2a–2b illustrate the operational flow of the relevant aspects of distributor/updater (client side) 134 of FIG. 1a, in accordance with one embodiment. As illustrated in FIG. 2a, upon invocation or start up, distributor/updater (client side) 134 determines if host client computer 132 is connected on-line, block 202. If host client computer 132 is not connected on-line, distributor/updater (client side) 134 would re-schedule itself to be re-invoked/re-started at a later time to attempt the check-in again, block 210. However, if host client computer 132 is connected on-line, distributor/updater (client side) 134 checks in with software supplier 102 to facilitate determination whether the installed software of software supplier 102 on client computer 132 needs to be updated, block 204. Next, distributor/updater (client side) 134 determines if the check-in resulted in client computer 132 being provided with an update task list, block 206. If client computer 132 is provided with an update task list, distributor/updater (client side) 134 schedules subsequent performance of the enumerated update tasks, block 208. Thereafter, distributor/updater (client side) 134 re-schedules itself to be re-invoked/re-started at a later time for the next check-in, block 210.

The on-line determination may be made in any one of a number of known techniques, e.g. by "pinging" software supplier 102 or other pre-determined servers.

The update determination may be made in one of a number of alternative manners. In one embodiment, during the check in process, distributor/updater (client side) 134 identifies itself as well as informs distributor/updater (server side) 110 of software supplier 102 of the version level of the installed software of software supplier 102, and distributor/updater (server side) 110 of supplier 102 authenticates the checking in client 134, compares the reported version level with the latest version level available, and informs distributor/updater (client side) 134 whether the installed software needs to be updated or not.

In alternate embodiments, software supplier 102 keeps track of the version level of its software installed on the various clients 132. Thus, during the check-in process, distributor/updater (client side) 134 merely identifies itself to distributor/updater (server side) 110 of supplier 102, and distributor/updater (server side) 110 of supplier 102 having knowledge of the version level of the installed software on the reporting client 132 would simply inform distributor/updater (client side) 134 whether the installed software needs to be updated or not, upon authenticating the checking in client 132.

In yet other embodiments, during the check-in process, distributor/updater (server side) 110 of supplier 102 informs distributor/updater (client side) 134 of the latest version of the installed software available, and distributor/updater (client side) 134 would make the determination whether update is necessary. Authentication of checking in clients 132 may be deferred (e.g. to the time when a client 132 requests for update software parts).

In other embodiments, distributor/updater 110/134 maintains the last check-in date and the time period for checking in with software supplier 102, and distributor/updater 110/134 uses the check-in timing information (in addition to or in lieu of the versioning information) to make the update determination. The time period between check-ins may vary for different software. Some software may have shorter periods in between check-ins, while others have longer periods in between check-ins.

Scheduling for the re-invocation/re-start of distributor/updater (client side) 134 may be made in any one of a number of known techniques, e.g. using scheduling service of an underlying operating system. In various embodiments, the check-in periodicity is initially configured when distributor/updater (client side) 134 is first installed on a client computer 132. Thereafter, the check-in periodicity may itself be periodically updated. In some embodiments, it is updated by distributor/updater (server side) 110 each time distributor/updater (client side) 134 checks in. In one embodiment, the next check-in time is also enumerated as part of a returned update task list. For this embodiment, the update task list is always returned (although it may contain only "administrative" information, such as the next check-in time, with no substantive update tasks to be performed). Typically, if re-scheduling is necessary after the check in period is up, e.g. because client 132 is connected on-line, distributor/updater (client side) 134 would re-schedule itself to be re-invoked/restarted in a relatively short time period to re-attempt the check-in. Obviously, the time period within which distributor/updater (client side) 134 is to retry to determine if client computer 132 is online is application dependent. Preferably, the user may control its length through one or more user controllable operating parameters.

In some embodiments, the present invention may be practiced with distributor/updater (server side) 110 (through distributor/updater (client side) 134) prompting the user of client 132, for acceptance, before providing the update task list (upon determining that update is necessary). In other embodiments, the update task list may be provided responsively without initially prompting for the user's consent. The user's consent may be prompted at a later time by distributor/updater (client side) 134 when the update tasks are to be performed.

In one embodiment, with respect to the scheduling of the update tasks to be subsequently performed, distributor/updater (client side) 134 merely schedule performance of the first task (as opposed to all tasks to be performed), and the subsequent tasks are successively scheduled after a prior task is completed. Typically, the task or tasks are scheduled to be performed at a time that is convenient for the user, e.g. during the third shift period from mid-night to 6 am. Preferably, the user convenient time periods are user defined, which may be specified in any one of a number of user configuration techniques known in the art.

Skipping briefing to FIG. 3, wherein a block diagram illustrating an outline of an update task list of the present invention, in accordance with one embodiment is shown. As illustrated, example update task list 300 includes a number of software part retrieval instructions 302, and a number of post-retrieval installation instructions 304–308. For the illustrated embodiment, each software part retrieval instruction 302 includes a source where the software part is to be retrieved, and an identifier of the part. The source information may include identification of a server as well as identification of a file directory on the server, within which the software part may be found. In one embodiment, the information is expressed as a uniform resource locator (URL). As alluded to earlier, the source for the software part may be the software supplier itself or it may be another third party (e.g. in the situation where an updated dependent software part is required).

As illustrated, post retrieval installation instructions may include compile/link instructions 304, execution instructions 306, and registry/database update instructions 308. Compile/link instructions 304 specify certain compilation/linkage tasks to be performed. Each such instruction 304 includes the compiler/linker to be employed, and identification of the part to be compiled/linked. Execution instructions 306 specify execution of certain install or other related programs. Finally, registry/database instructions 308 specify entries to be made into certain operating system registry or control databases.

These instructions may be expressed in a proprietary format understood only by distributor/updater (client side) 134, or it may be expressed using any one of a number of programming/script languages, such as C, Java, JavaScript or PERL, and the like.

Referring now to FIG. 2b, where the operational flow of the task performance aspect of distributor/updater (client side) 134 of FIG. 1a is shown, in accordance with one embodiment. As illustrated, upon having been invoked/started to asynchronously perform the enumerated update tasks, distributor/updater (client side) 134 first determines if client 132 is connected online, block 222. If client 132 is not connected on-line, for the embodiment, distributor/updater (client side) 134 reschedules itself to be re-invoked/restarted at a later point in time, block 223. In one embodiment, distributor/updater (client side) 134 would attempt to cause client 132 to be connected online, and reschedules itself only upon failing to connect client 132.

Upon determining client 132 is connected online or causing it to be connected on-line, distributor/updater (client side) 134 would attempt to contact a server of software supplier 102 (or a third party) to attempt to retrieve the next required software part (as specified by the task list), block 224. Next, distributor/updater (client side) 134 determines if it was successful in making the retrieval, block 226. If distributor/updater (client side) 134 was successful, distributor/updater (client side) 134 accumulates the retrieved part, block 228. Thereafter, distributor/updater (client side) 134 determines if all specified parts have been retrieved. On the other hand, if distributor/updater (client side) 134 was unsuccessful in retrieving a part, distributor/updater (client side) 134 would "mark" the part to be retrieved for retry at a later time, block 230.

Upon determining not all specified parts have been retrieved or upon marking a part for retry at a later time, distributor/updater (client side) 134 determines if there are more parts to retry now, block 234. If more retrievals are to be attempted, the process continues back at block 222, otherwise, the process continues back at block 223.

Eventually, distributor/updater (client side) 134 would determine at block 232 that all specified parts have been retrieved. At such time, distributor/updater (client side) 134 would proceed and perform the specified installation tasks, which may include compiling and/or linking certain retrieved parts as well as updating system "configuration" registry/database, and so forth. The terms "compiling" and "linking" are used herein in a general sense to represent the typical set up operations performed to ready executables for execution.

Distributor/Updater (Server Side)

Figure 4A:
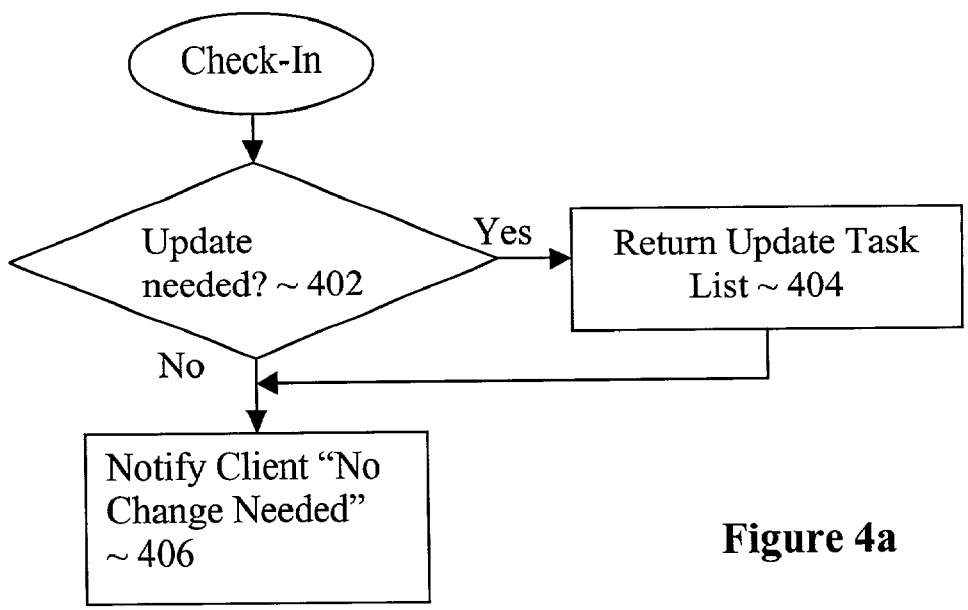
FIGS. 4a–4b illustrate the operational flow of the relevant aspects of the distributor/updater (server side) of FIG. 1, in accordance with one embodiment.
Figure 4B:
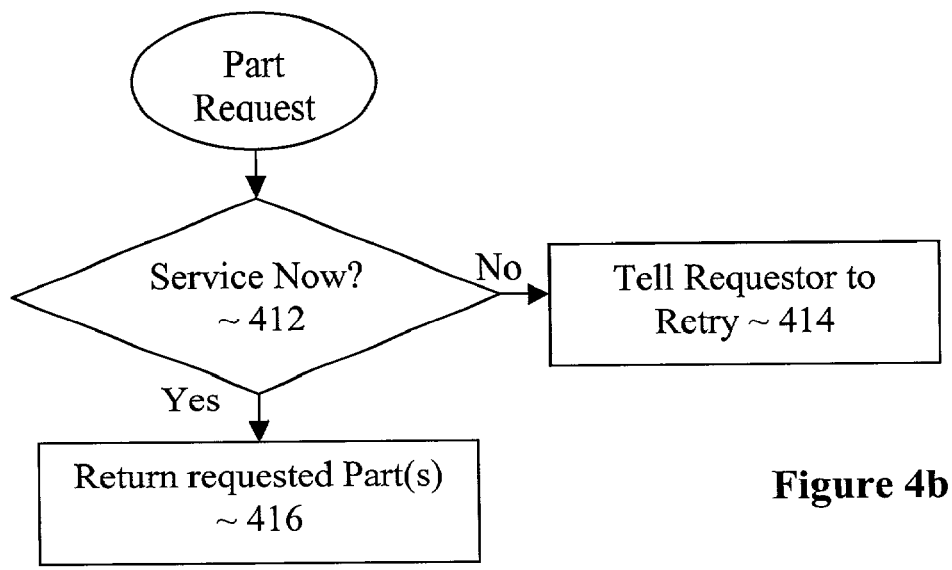

FIGS. 4a–4b illustrate the operational flow of the relevant aspects of distributor/updater (server side) 110 of supplier 102 of FIG. 1a, in accordance with one embodiment. As illustrated in FIG. 4a, upon contacted by a client 132 checking in to determine whether the installed software of the supplier on client 132 needs to be updated, distributor/updater (server side) 110 of supplier 102, together with its counterpart distributor/updater (client side) 134, cooperatively make the determination, block 402. As described earlier, the determination may be made by distributor/updater (server side) 110, distributor/updater (client side) 134, or jointly. If it is determined that update is not necessary, checking in client 132 is notified accordingly, block 406. However, if it is determined that update is necessary, distributor/updater (server side) 110 provides its counterpart, distributor/updater (client side) 134, with the earlier described update task list, block 404. In one embodiment, the update task list is selected from a number of pre-generated update task lists listing the update tasks necessary for various combinations of the down level versions and computing environment factors. For examples, a first pre-generated task list would list the update tasks to be performed if a client is updating from the most current level minus one, executing with processor family A and operating system version x, a second pre-generated task list would list the update tasks to be performed if a client is updating from the most current level minus two, executing with the same processor and operating system combination, a third pre-generated task list would list the update tasks to be performed if a client is updating from the most current level minus one, executing with processor family B and operating system version y, and so forth.

In addition to processor family and operation system versions, computing environment factors may also include other hardware/software factors, such as the type of audio/video device/driver used, the type of network adapter and networking protocol employed, and forth. In these embodiments, where the computing environment factors are considered in the provision of the update task list, the computing environment metrics of a checking in client may be pre-provided by the client 132 during a registration service, and maintained by software supplier 102. Alternatively, the computing environment information may be provided by client 132 each time it checks in with software supplier 102.

As illustrated in FIG. 4b, upon having been subsequently contacted by a requesting client 132, for the embodiment, distributor/updater (server side) 110 of supplier 102 determines if the request is to be serviced immediately, block 412. If distributor/updater (server side) 110 determines the request is not to be serviced immediately, distributor/updater (server side) 110 would ask its counterpart, distributor/updater (client side) 134 to retry later, block 414. However, if it is determined that the request is to be service immediately, distributor/updater (server side) 110 returns the requested part/parts to client 132, block 416.

Sample Data Organizations

FIGS. 5a–5b illustrate two example data organizations suitable for use to implement databases 107 and 108 of FIG. 1 to store the software and client related information for practicing the present invention, in accordance with one embodiment. As illustrated in FIG. 5a, software related table/view 500 includes column 502 for storing the software identifiers (for a software supplier supplying multiple software "packages"). Table/view 500 also include columns 504, 506 and 508 for storing "old" version identifiers of the various software, various environmental metrics that are relevant in determining the update actions, and task list identifiers identifying the update task lists for the corresponding combinations of "old" version and the environmental metrics. As alluded to earlier, examples of computing environmental metrics include but are not limited to processor family type, operating system levels, and so forth. As shown, table 500 may also include other columns, such as column 509, for storing other data.

Similarly, as illustrated in FIG. 5b, client table/view 520 includes column 522 and columns 524 for storing client identifiers, and the clients' basic information, such as their IP addresses, user names, addresses, phone numbers, fax numbers, email addresses, and so forth. Client table/view 520 further includes columns 526 for storing various computing environment metric information that are relevant in determining the update actions. Table/view 520 may also include other columns, such as column 529 for storing other client related data.

In one embodiment, tables/views 500 and 520 are relational tables/views of one or more relational databases. In alternate embodiments, other equivalent data structures may be used instead.

Further, in alternate embodiments, the present invention may also be practiced with the software supplier maintaining more or less client related information. Client information employed in the selection of the update task list that are not maintained by the software supplier may be provided by the client during the check in process instead.

EXAMPLE COMPUTER SYSTEM

Figure 6:
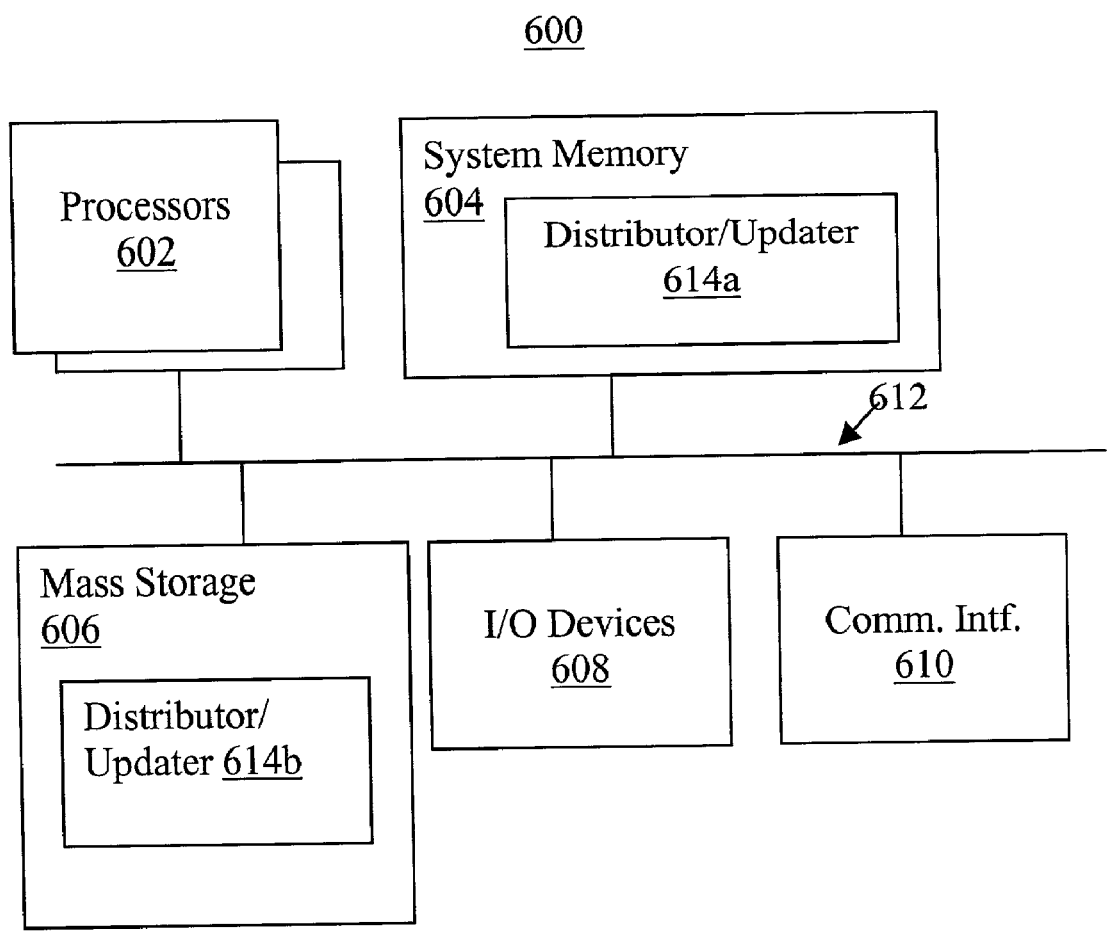
FIG. 6 illustrates an example computer system suitable for use to practice the present invention, in accordance with one embodiment.

FIG. 6 illustrates an example computer system suitable for use as a server to host the category name service (and optionally, the supplemental services) of the present invention, in accordance with one embodiment. As shown, computer system 600 includes one or more processors 602 and system memory 604. Additionally, computer system 600 includes mass storage devices 606 (such as diskette, hard drive, CDROM and so forth), input/output devices 608 (such as keyboard, cursor control and so forth) and communication interfaces 610 (such as network interface cards, modems and so forth). The elements are coupled to each other via system bus 612, which represents one or more buses. In the case of multiple buses, they are bridged by one or more bus bridges (not shown). Each of these elements performs its conventional functions known in the art. In particular, system memory 604 and mass storage 606 are employed to store a working copy and a permanent copy of the programming instructions implementing the distributor/updater (the server side or the client side) of the present invention. The permanent copy of the programming instructions may be loaded into mass storage 606 in the factory, or in the field, as described earlier, through a distribution medium (not shown) or through communication interface 610 (from a distribution server (not shown). The constitution of these elements 602-612 are known, and accordingly will not be further described.

CONCLUSION AND EPILOGUE

Thus, it can be seen from the above descriptions, a novel method and apparatus for asynchronously updating software has been described. The novel method/apparatus is advantageously scalable to support a very large number of client computers requiring software update services.

While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. In a server, a method of operation comprising:
    accepting check in by a client computer at a first point in time to determine if the client computer's software needs to be updated; and
    providing the client computer with an update task list listing one or more tasks to be performed by the client computer asynchronously at a later point or later points in time to update the client computer's software, if it is determined that the client computer's software is to be updated.

2. The method of claim 1, wherein the method further comprises determining if the client computer's software needs to be updated.

3. The method of claim 1, wherein said one or more tasks to be performed by the client computer asynchronously at a later point or later points in time to update the client computer's software comprise re-contacting the server at a later point or later points in times to retrieve one or more software parts.

4. The method of claim 1, wherein said one or more tasks to be performed by the client computer asynchronously at a later point or later points in time to update the client computer's software comprise contacting one or more third part servers at a later point or later points in times to retrieve one or more software parts.

5. The method of claim 1, wherein said one or more tasks to be performed by the client computer asynchronously at a later point or later points in time to update the client computer's software comprise one or more installation tasks to be performed asynchronously at a later point or later points in time upon asynchronously obtaining one or more software parts.

6. The method of claim 1, wherein the method further comprises servicing one or more subsequent asynchronous requests from the client computer for software parts in accordance with the tasks listed in said task list.

7. The method of claim 6, wherein said servicing comprises asking the client computer to retry one or more of the subsequent asynchronous requests for software parts.

8. In a client computer, a method of operation comprising:
    periodically checking in with a server to determine if the client computer's software needs to be updated;
    receiving from the server an update task list listing one or more tasks to be performed by the client computer asynchronously at a later point or later points in time to update the client computer's software, upon determining the client computer's software needs to be updated; and
    performing said one or more tasks asynchronously at a later point or later points in time to update the client computer's software.

9. The method of claim 8, wherein said one or more tasks to be performed by the client computer asynchronously at a later point or later points in time to update the client computer's software comprise re-contacting the server at a later point or later points in times to retrieve one or more software parts.

10. The method of claim 8, wherein said one or more tasks to be performed by the client computer asynchronously at a later point or later points in time to update the client computer's software comprise contacting one or more third part servers at a later point or later points in times to retrieve one or more software parts.

11. The method of claim 8, wherein said one or more tasks to be performed by the client computer asynchronously at a later point or later points in time to update the client computer's software comprise one or more installation tasks to be performed asynchronously at a later point or later points in time upon asynchronously obtaining one or more software parts.

12. The method of claim 8, wherein the method further comprises scheduling asynchronous performance of said tasks.

13. An apparatus comprising:
    storage medium having stored therein a plurality of programming instructions designed to accept check in by a client computer at a first point in time to determine if the client computer's software needs to be updated, and to provide the client computer with an update task list listing one or more tasks to be performed by the client computer asynchronously at a later point or later points in time to update the client computer's software, if it is determined that the client computer's software is to be updated; and
    at least one processor coupled to the storage medium to execute the programming instructions.

14. The apparatus of claim 13, wherein the programming instructions are further designed to determine whether the client computer's software needs to be updated.

15. The apparatus of claim 13, wherein said one or more tasks to be performed by the client computer asynchronously at a later point or later points in time to update the client computer's software comprise re-contacting the apparatus at a later point or later points in times to retrieve one or more software parts.

16. The apparatus of claim 13, wherein said one or more tasks to be performed by the client computer asynchronously at a later point or later points in time to update the client computer's software comprise contacting one or more third part servers at a later point or later points in times to retrieve one or more software parts.

17. The apparatus of claim 13, wherein said one or more tasks to be performed by the client computer asynchronously at a later point or later points in time to update the client computer's software comprise one or more installation tasks to be performed asynchronously at a later point or later points in time upon asynchronously obtaining one or more software parts.

18. The apparatus of claim 13, wherein the programming instructions are further designed to service one or more subsequent asynchronous requests from the client computer for software parts in accordance with the tasks listed in said task list.

19. The apparatus of claim 18, wherein said programming instructions are further designed to ask the client computer to retry one or more of the subsequent asynchronous requests for software parts.

20. A client computer comprising:
    storage medium having stored therein a plurality of programming instructions designed to periodically check in with a server to determine if the client computer's software needs to be updated, to receive from the server an update task list listing one or more tasks to be performed by the client computer asynchronously at a later point or later points in time to update the client computer's software, upon determining the client computer's software needs to be updated, and to perform said one or more tasks asynchronously at a later point or later points in time to update the client computer's software; and
    at least one processor coupled to the storage medium to execute the programming instructions.

21. The client computer of claim 20, wherein said one or more tasks to be performed by the client computer asynchronously at a later point or later points in time to update the client computer's software comprise re-contacting the server at a later point or later points in times to retrieve one or more software parts.

22. The client computer of claim 20, wherein said one or more tasks to be performed by the client computer asynchronously at a later point or later points in time to update the client computer's software comprise contacting one or more third part servers at a later point or later points in times to retrieve one or more software parts.

23. The client computer of claim 20, wherein said one or more tasks to be performed by the client computer asynchronously at a later point or later points in time to update the client computer's software comprise one or more installation tasks to be performed asynchronously at a later point or later points in time upon asynchronously obtaining one or more software parts.

24. The client computer of claim 20, wherein the programming instructions are further designed to schedule asynchronous performance of said tasks.

* * * * *

UNITED STATES PATENT AND TRADEMARK OFFICE
CERTIFICATE OF CORRECTION

PATENT NO. : 7,143,406 B2 Page 1 of 1
APPLICATION NO. : 09/768658
DATED : November 28, 2006
INVENTOR(S) : Jeremy A. Kenyon and Geoffrey K. Bauman It is certified that error appears in the above-identified patent and that said Letters Patent is hereby corrected as shown below:

Column 3
Line 12, "...specifically, its' computing..." should read --...specifically, its computing...--.

Column 9
Line 16, "...(from a distribution server(not shown)..." should read --...(from a distribution server (not shown))...--.
Line 53, "...points in times..." should read --...points in time...--.
Line 59, "...third part servers..." should read --...third party servers...--.
Line 59, "...points in times..." should read --...points in time...--.

Column 10
Line 24, "...points in times..." should read --... points in time...--.
Line 31, "...third part servers..." should read --...third party servers...--.
Line 31, "...points in times..." should read --...points in time...--.
Line 63, "...points in times..." should read --... points in time...--.

Column 11
Line 2, "...third part servers..." should read --...third party servers ...--.
Line 2, "... points in times..." should read --... points in time...--.

Column 12
Line 16, "...third part servers..." should read --...third party servers...--.
Line 16, "...points in times..." should read --...points in time...--.

Signed and Sealed this

Twenty-sixth Day of June, 2007

JON W. DUDAS
*Director of the United States Patent and Trademark Office*